United States Patent [19]

Barnes et al.

[11] Patent Number: 4,767,276
[45] Date of Patent: Aug. 30, 1988

[54] RETAINER RING

[75] Inventors: Thomas C. Barnes, Concord; David R. Abbott, Manchester; Anthony S. Arrao, Belmont, all of Mass.

[73] Assignee: General Electric Company, Lynn, Mass.

[21] Appl. No.: 943,393

[22] Filed: Dec. 19, 1986

[51] Int. Cl.⁴ ............................................. F01D 5/32
[52] U.S. Cl. ................................ 416/221; 416/220 R
[58] Field of Search .......... 416/193 A, 219 R, 220 R, 416/221, 198 A; 403/338, 335

[56] References Cited

U.S. PATENT DOCUMENTS

| | | | |
|---|---|---|---|
| 2,614,796 | 10/1952 | Miller | 403/338 |
| 2,662,725 | 12/1953 | McVeigh | 403/338 X |
| 2,772,853 | 12/1956 | Woodworth | 416/198 A X |
| 2,982,518 | 5/1961 | Hunt, Jr. | |
| 2,998,959 | 9/1961 | Haworth et al. | |
| 3,077,811 | 2/1963 | Moore | 85/8.6 |
| 3,544,138 | 12/1970 | Von Eiff | 403/338 X |
| 3,957,393 | 5/1976 | Bandurick | 416/220 X |
| 4,021,138 | 5/1977 | Scalzo et al. | 416/220 R X |
| 4,065,846 | 1/1978 | Leonard | 403/338 X |
| 4,171,930 | 10/1979 | Brisken et al. | 416/220 |
| 4,189,282 | 2/1980 | Benoist et al. | 416/221 |
| 4,304,523 | 12/1981 | Corsmeier et al. | 416/221 |
| 4,349,318 | 9/1982 | Libertini et al. | 416/221 X |
| 4,480,959 | 11/1984 | Bourguignon et al. | 416/220 R |
| 4,606,111 | 8/1986 | Okazaki et al. | 403/338 X |

FOREIGN PATENT DOCUMENTS

| | | | |
|---|---|---|---|
| EP43590 | 1/1982 | European Pat. Off. | 403/335 |
| 109864 | 2/1944 | Sweden | 416/214 A |
| 1360863 | 7/1974 | United Kingdom. | |

OTHER PUBLICATIONS

German Printed Application No. M20101 Ia/46f; Dec. 1955; Schörner.

Primary Examiner—Everette A. Powell, Jr.
Attorney, Agent, or Firm—Francis L. Conte; Derek P. Lawrence

[57] ABSTRACT

A retainer ring clamps, for example, a turbine cooling plate to a rotatable turbine disc. The retainer ring has a wedge-shaped channel that engages annular flanges on the cooling plate and the disc. The wedge-shaped channel converts radial forces on the ring to axial clamping forces which secure the cooling plate to the disc. Special tooling is not required to assemble the retainer ring to the cooling plate and turbine disc, and preloading of the cooling plate against the disc is not necessary. An angled or slanted gap in the ring eases assembly and disassembly of the retainer ring onto the annular flanges of the cooling plate and turbine disc and ensures that axial and radial movement of the retainer ring is required for disassembly of the ring from the flanges.

13 Claims, 3 Drawing Sheets

RETAINER RING

RETAINER RING

The United States Government has rights in this invention pursuant to Contract No. DAAK51-83-C-0014 awarded by the Department of the Army.

FIELD OF THE INVENTION

This invention relates generally to apparatus for clamping or pressing together two or more mechanical elements. More specifically, this invention relates to retainer rings, which are particularly useful for securing together two or more mechanical components in a gas turbine engine.

BACKGROUND OF THE INVENTION

An important concern in the field of gas turbine engines is the retention of blades on the periphery of rotatable turbine discs. Typically, those blades are held radially and circumferentially on the periphery of those discs by means of a dovetail joint. For example, the root, or radially innermost end, of each turbine blade may have a dovetail projection inserted axially into a complementary slot in the periphery of the disc. The blades may be conventionally retained axially in their respective slots by annular cooling plates fastened to one or both sides of the disc with nuts and bolts. Those nuts and bolts, however, may increase windage and fluid temperature in the engine, especially when they are used to secure together rotatable components in the gas turbine engine. Also, stress concentrations may develop at the bolt holes and must be suitably accommodated. Yet further, a large number of nuts and bolts are usually required, thus complicating assembly and disassembly of the cooling plate to the disc.

To avoid the problems attending the retention of turbine blades on the periphery of the turbine discs with cooling plates bolted to the turbine disc, boltless retainers have been developed.

For example, U.S. Pat. No. 4,304,523 - Corsmeier et al, assigned to the present assignee, discloses a boltless blade retainer secured in a recess in a turbine disc by a split retainer ring. Assembly of the blade retainer and retainer ring to the turbine disc requires compression and clamping tools.

U.S. Pat. No. 4,171,930 - Brisken et al, assigned to the present assignee, discloses a U-shaped retainer ring for axially holding a boltless blade retainer to a turbine disc.

The boltless retainers described in the patents referred to above have been satisfactory for their intended purposes. Applicant has developed, however, a boltless retainer ring which is easier to assemble, resists permanent mechanical deformation, provides clamping force comparable to that provided by nuts and bolts, and does not require manufacturing tolerances as tight as those required for prior boltless retainers.

It thus is an object of the invention to provide new retaining means effective for providing clamping forces without the use of nuts and bolts.

It is another object of the invention to provide a novel retainer ring which requires no special tooling to assemble it to mechanical components to be secured together.

It is another object of this invention to provide a novel retainer ring which resists permanent mechanical deformation.

It is yet another object of this invention to provide a novel retainer ring for clamping together at least two members without the need for tight tolerances in the manufacture of the ring.

SUMMARY OF THE INVENTION

The present invention includes retaining means having a retainer ring for converting at least a portion of radial force on the ring to axial clamping force on first and second components. In one embodiment, the retainer ring is split and has a generally wedge-shaped channel engaging the first and second components, such as annular flanges on a cooling plate and a turbine disc.

BRIEF DESCRIPTION OF THE DRAWINGS

The novel features believed characteristic of the invention are set forth in the appended claims. The invention, in accordance with preferred embodiments, together with further objects and advantages, is more particularly described in the following detailed description taken in conjunction with the accompanying drawings in which:

FIGS. 4A—4D show details of a gap in the retainer ring and illustrate the assembly of the ring onto a turbine assembly.

FIG. 4A is a perspective view of the entire retainer ring.

FIG. 4B is a partial side view of the retainer ring in the region of the gap taken in a direction indicated by arrows 4B—4B in FIG. 4A.

FIG. 4C is a partial frontal view of the retainer ring in the region of the gap taken in a direction indicated by arrows 4C—4C in FIG. 4A.

DETAILED DESCRIPTION OF THE INVENTION

Figure 1:
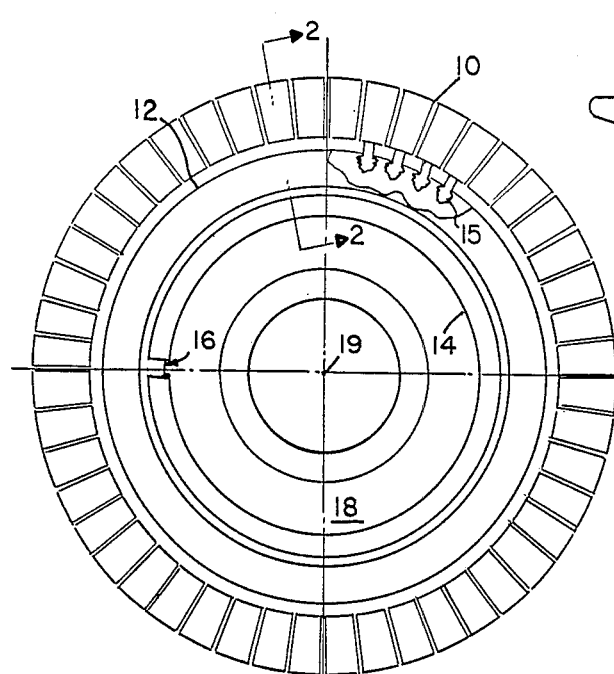
FIG. 1 is a schematic diagram of a turbine bladed disc assembly normal to an axial centerline axis thereof having a retainer ring in accordance with one embodiment of the invention.

FIG. 1 is a schematic diagram of a turbine bladed disc assembly of a gas turbine engine in accordance with one embodiment of the invention. The turbine assembly comprises a turbine disc 18 rotatable about an axial centerline axis 19. A plurality of radially extending turbine blades 10 are attached to the periphery of disc 18. The radially innermost ends 15 of the blades 10 are secured radially and circumferentially to the disc 18 in a known manner, for example, by means of the previously mentioned dovetail joints. The Corsmeier et al and Brisken et al patents mentioned above describe detailed examples of such dovetail joints.

The blades are retained axially on the periphery of the disc 18 by an annular cooling plate 12 which is concentric with the disc 18 and which covers the ends 15 of blades 10 as shown in FIG. 1. The cooling plate 12 is secured to the disc 18 by an annular boltless retainer ring 14 concentric with the turbine disc 18. The ring 14 is split at one position along its circumference by a gap 16. As discussed more fully below, the gap 16 permits easy assembly and removal of the ring 14 to and from the disc 18 and plate 12.

Only one side of the turbine assembly is shown in FIG. 1. The other side may have an annular cooling plate and retainer ring like the ones shown in FIG. 1 to secure the blades axially on the other side of the disc. The blades may also be axially secured on the other side of the disc in any other known manner.

Figure 2:
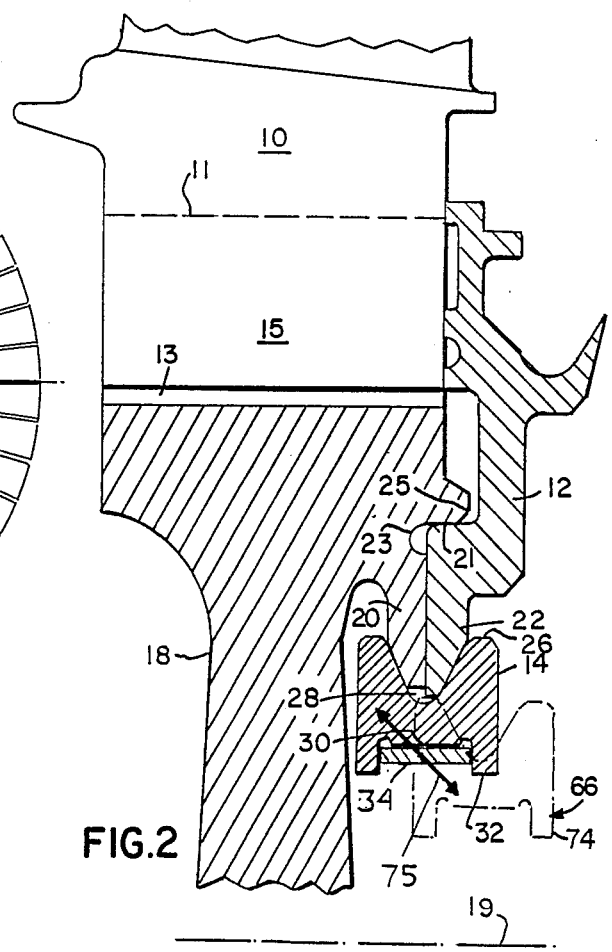
FIG. 2 shows a partial sectional side view of the blade retaining means of the FIG. 1 structure taken along line 2—2.

FIG. 2 shows a partial sectional side view of the turbine assembly of FIG. 1. FIG. 2 shows the radially innermost end of one of the blades 10 of FIG. 1 inserted into one of the previously mentioned dovetail slots, the top of the slot being indicated in FIG. 2 by a dotted line 11. In this embodiment, the bottom of the blade 10 does not reach the bottom of the dovetail slot so that a space 13 is left at the bottom of the slot after insertion of the blade into the slot.

The cooling plate 12 is generally annular. A step 21 on the plate 12 is fitted into a recess 23 in the disc 18 so that the step 21 is frictionally engaged with an axially extending wall 25 of the recess 23. The disc 18 has a radially inwardly extending annular flange 20 which is pressed or clamped against a radially inwardly extending annular flange 22 on plate 12 by ring 14. The ring 14, in accordance with one embodiment of the invention, is generally rectangular in cross section and has a wedge-shaped, or generally V-shaped, channel 24 (FIG. 3) in a radially outer peripheral surface or rim 26 of the ring 14. The channel 24 clamps flanges 20 and 22 together to fix the plate 12 to the disc 18 and axially retain the blades 10 on the periphery of disc 18 by preventing the blades 10 from sliding out from one side of the dovetail slots.

The channel 24 is predeterminedly sized in the radial direction to be deep enough so that a space 28 remains in the bottom of the channel 24 when flanges 20 and 22 are securely wedged into the channel 24. The shape of channel 24 permits the ring 14 to provide an axial clamping force on flanges 20 and 22 in a direction generally parallel to axis 19 in response to radial force on the ring 14 in the radial direction generally perpendicular to axis 19, which passes through the ring 14.

More specifically, the ring 14 is formed of any suitable material, such as, for example, commercially available Inconel 718, so that in conjunction with the gap 16, the ring 14 is resilient or suitably elastic so that it may expand without plastic deformation. The gap 16 in the ring 14 and the space 28 allow the ring 14 to expand radially outward as necessary in response to radial forces. Such radial forces are caused by initial contraction of the retainer ring 14 during assembly, centrifugal force generated by the rotation of the turbine assembly, and any other radial force on the retainer ring 14.

The space 28 in the bottom of the channel permits such expansion of the retainer ring, which results in the desired clamping force on flanges 20 and 22. The wedge-shaped channel 24 and space 28 also permit a loosening of manufacturing tolerances on the dimensions of the flanges 20 and 22 as compared with an apparatus using the U-shaped clip such as the one shown in the Brisken et al patent described above.

Ring 14 may also include a rectangular recess 30 in its inner surface 32 in which a continuous retention band 34 is suitably expanded. The retention band 34 provides outward force to hold the ring 14 in place against flanges 20 and 22 in the event of any failure of the ring 14 until the ring 14 can be replaced.

Figure 3:
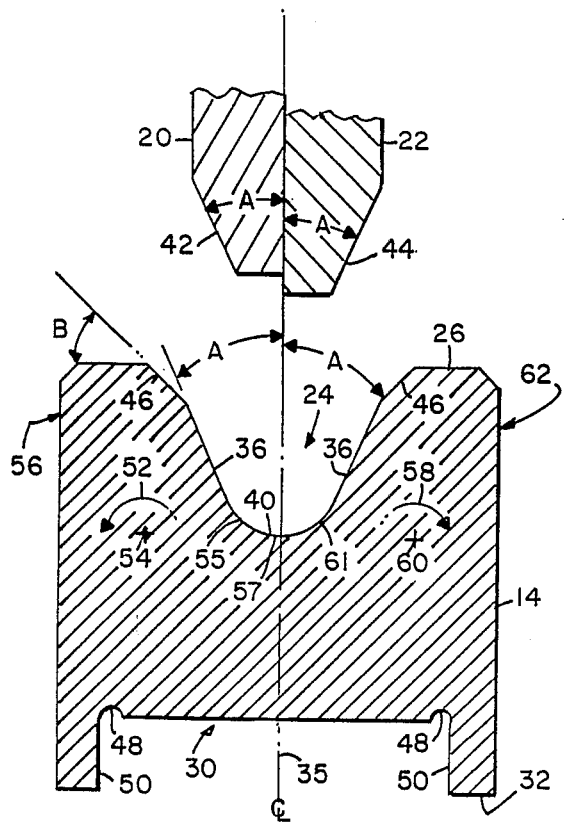
FIG. 3 shows a more detailed exploded view of portions of the FIG. 2 structure.

FIG. 3 is a more detailed diagram of a partial cross section of the ring 14, with the flanges 20 and 22 shown spaced therefrom. The ring 14 is symmetric about a radial centerline 35. Channel 24 is generally wedge-shaped and has two surfaces or sidewalls 36 which provide clamping force against faces 42 and 44 on flanges 20 and 22. Each surface 36 and faces 42 and 44 are at a predetermined angle A with respect to the centerline 35. In the embodiment illustrated, angle A may be preferably about 25 degrees. In other words, surfaces 36 may define an included angle of about 50 degrees with respect to each other. Likewise, faces 42 and 44 may also be disposed at an angle of about 25 degrees with respect to the centerline 35 or about 50 degrees with respect to each other.

As the angle A decreases in value the amount of axial clamping force increases per unit of radial force, but stress in the ring correspondingly increases. And at relatively low values of angle A the ring 14 might, undesirably, stick to the flange 20 and 22 due to the radial loads. An angle A of 25 degrees is preferred because it represents a compromise among these considerations.

Surfaces 36 are connected by a curved bottom surface 40 of channel 24. The lengths of flanges 20 and 22 and the nature of surface 40 are such that space 28 (FIG. 2) is formed when flanges 20 and 22 are clamped securely in channel 24.

A pair of surfaces 46 around the outer rim or periphery of the ring 14 widens the opening of channel 24 to facilitate insertion of flanges 20 and 22 into channel 24. Surfaces 46 are at a predetermined angle B with respect to a horizontal line disposed perpendicularly to the centerline 35 in FIG. 3. Angle B is preferably about 45 degrees. Surfaces 46 may also be other shapes, such as arcuate, to provide a chamfer for increasing ease of assembly of the ring 14 onto the flanges 20 and 22.

The rectangular recess 30 is defined by and between two radially inward and spaced leg members 50. A groove 48 is disposed in the radially inner surface of the ring 14 at each of the bases of the members 50 in recess 30 to ease placement and removal of the retention band 34 on the ring 14 (FIG. 2). Binding of the edge of band 34 on either member 50 during insertion or removal of band 34 in recess 30 is thereby avoided.

Permanent mechanical deformation is also to be avoided in retainer rings. During operation, stresses are created in the ring 14 by reaction forces exerted on the ring 14 by flanges 20 and 22. Those stresses tend to bend extensions 56 and 62 (which define the channel 24) in the area of base points 54 and 60 as illustrated by arrows 52 and 58. Maximum stress occurs in the vicinity of points 55, 57, or 61 of the bottom surface 40. The configuration of ring 14 having the preferred angle A of 25 degrees is such that its thickness and rigidity are greatest along the plane of the base points 54 and 60, thereby ensuring that stress in the vicinity of the points of maximum stress is relatively low. The ring 14 thus has an increased ability to resist permanent deformation.

Figure 4A:
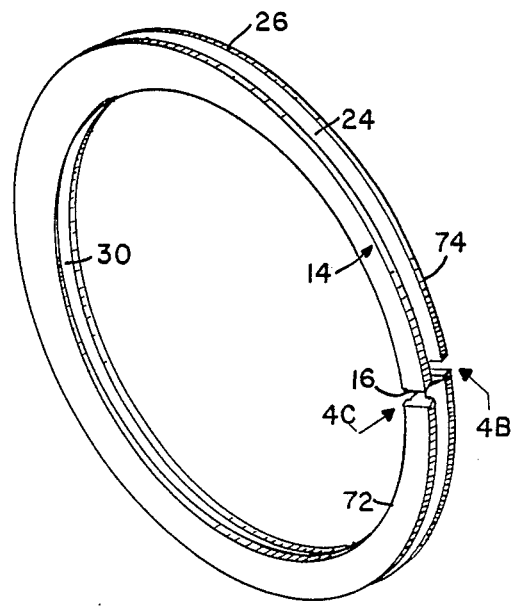
Figure 4B:
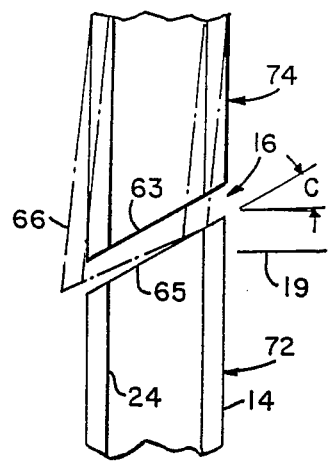
Figure 4C:
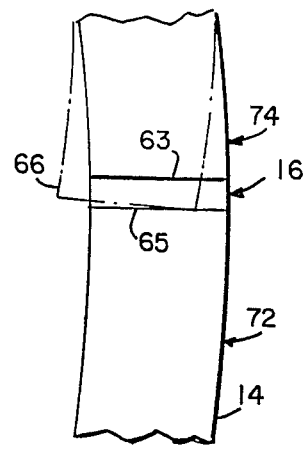

FIG. 4A shows a perspective view of an entire ring 14 removed from the turbine assembly and is given to assist in understanding the orientations shown in FIGS. 4B–4C.

FIG. 4B shows in more detail the gap 16 in ring 14. The gap 16 is formed in the retainer ring such that a plane passing through the gap 16 is parallel to the end faces 63 and 65 of the retainer ring 14 but is at an angle C with respect to axis 19. Preferably, the plane that passes through the gap 16 in this fashion also passes through the geometric center of the ring. Angle C may be about 22 degrees, 30 minutes. Gap 16 is slanted in this fashion to allow use of a very small distance between the end faces 63 and 65, preferably about 0.100 inches after assembly. Even though the distance between the end faces is small, the ring 14 can be compressed radially by a relatively large amount during assembly because the end faces 63 and 65 may slide against each other during compression. The axial displacement thereof is substantially less than that which would otherwise be required by axially displacing the end faces for overlapping each other, which might risk permanent mechanical deformation of the ring. The gap 16 is also slanted in this fashion so that both radial and axial motion is required to remove the ring 14 from the turbine assembly.

FIGS. 2, 4B and 4C illustrate the assembly of the ring 14 on the flanges 20 and 22. When the ring 14 is unstressed off the turbine assembly, it has a diameter which is greater than when it is assembled under the flanges 20 and 22 in the turbine assembly. During assembly, the ring 14 is radially compressed and positioned under the flanges 20 and 22, and then allowed to expand. The expansion of the ring 14 due to its resilience produces radial force in the ring 14, which results in initial axial clamping forces on flanges 20 and 22 when they are wedged in channel 24.

An exemplary method to assemble the ring 14 on the turbine assembly includes first cooling the plate 12, with dry ice for example, to reduce its size so as to allow step 21 to fit into recess 23 on the disc 18 as shown in FIG. 2. The cooled plate 12 is placed against disc 18 so that flanges 20 and 22 are aligned as shown in FIG. 2. As the temperature of the cooling plate returns to normal, the plate 12 expands so that it is securely fixed in recess 23. The ring 14 is then manually compressed as indicated by the phantom lines 66 to preload the ring 14. This is accomplished by moving an end 74 disposed on one side of the gap 16 radially inward and axially away with respect to an end 72 disposed on the other side of the gap 16 as shown by the lines 66, which represent the displaced end 74 with respect to the non-displaced end 72. As is evident from FIGS. 4B and 4C, the slanting of gap 16 permits the ring 14 to be radially compressed a substantial amount without undue axial displacement of ends 72 and 74 while, at the same time, not requiring a great deal of spacing between the end faces 63 and 65. After such compression, end 74 (FIGS. 4B and 4C) is engaged with flanges 20 and 22 by moving it radially outward and axially toward flanges 20 and 22 as shown by arrow 75 in FIG. 2. The remainder of the ring 14 is spiraled clockwise onto the flanges 20 and 22. The end 72 finally is fitted over the flanges 20 and 22, which is easily accomplished because of the angle C of the gap 16.

Disassembly of the ring 14 is accomplished by reversing the above procedure. The end 72 of the ring 14 must first be pulled radially inward and axially away from the disc 18. The ring 14 is then spiraled counterclockwise away from flanges 20 and 22. The requirement of radial and axial movement to remove the ring 14 prevents inadvertent removal thereof.

FIGS. 5A-5D and 6A-6C show partial cross sectional views of other examples of channel configurations for retainer ring 14. Many configurations are possible for which several features are common. In each configuration, and like the embodiment described above, the width of the channel decreases with increasing depth (i. e. "wedge-shaped"), at least over a portion of the depth, to provide a wedging action which axially clamps flanges 20 and 22. Each example also has a space 28 adjacent to the channel bottom 40 when the two flanges 20 and 22 are securely clamped by the ring 14. In each case, at least one of the extensions 56 and 62 should preferably thicken with increasing depth and should be preferably sufficiently thick at the base thereof for reducing stress at the locations of maximum stress to resist deformation. The surfaces 42 and 44 on flanges 20 and 22 preferably should be complementary to surfaces 36 to effectuate the desired wedging action for obtaining clamping forces.

Figure 5A:
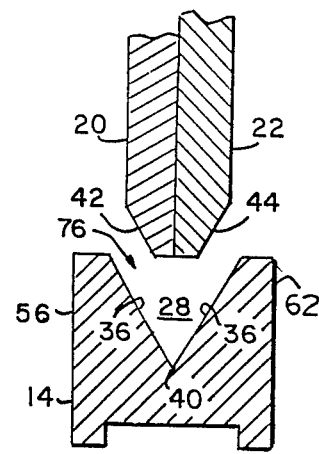
FIGS. 5A–5D and 6A–6C show other embodiments of the invention.
Figure 5B:
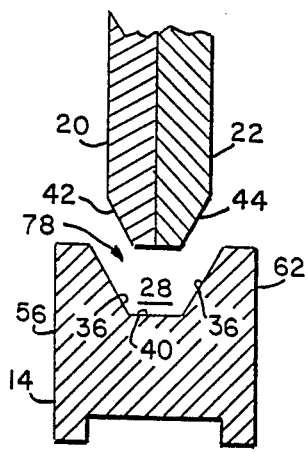
Figure 5C:
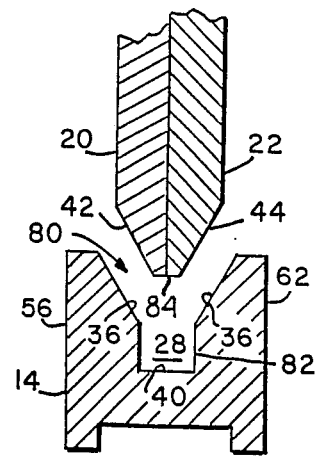
Figure 5D:
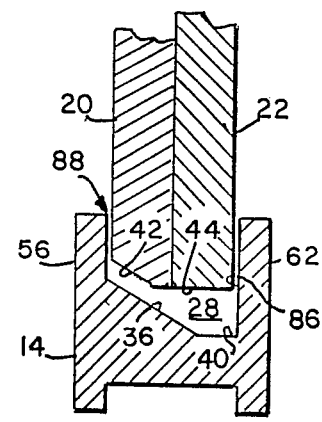

The examples of FIGS. 5A-5D have wedge-shaped channels with straight surfaces or sidewalls 36. FIG. 5A shows a V-shaped channel 76. A truncated V-shaped channel 78 having a flat bottom is shown in FIG. 5B. FIG. 5C shows a V-shaped channel 80 with a rectangular or square recess 82 at the bottom of the channel. The recess 82 is needed to accommodate surfaces 42 and 44, which join to form a sharp edge 84. A half-V-shaped channel 88 is shown in FIG. 5D. the half-V-shaped channel 88 has one sloping surface 36 and a non-sloping radially extending wall 86.

Figure 6A:
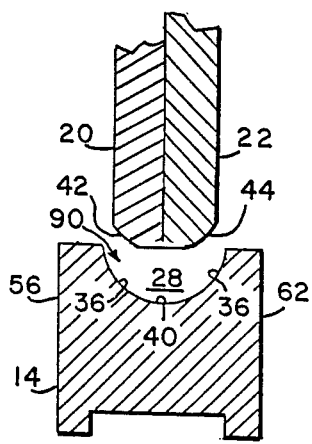
Figure 6B:
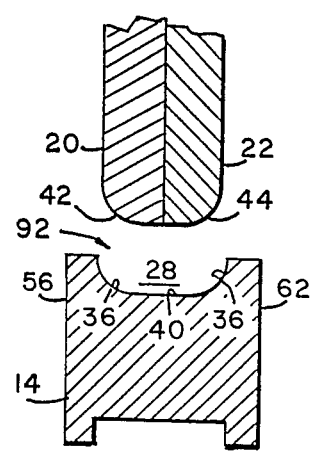
Figure 6C:
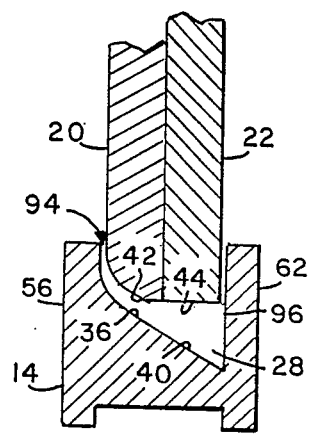

FIGS. 6A-6C illustrate additional embodiments of wedge-shaped channels with curved surfaces or sidewalls 36. FIG. 6A shows a semi-circular channel 90. Other curved surfaces can be used, such as oval or elliptical surfaces. FIG. 6B shows a truncated semi-circular channel 92 having a flat bottom 40. A modified curved channel 94 is shown in FIG. 6C. This channel 94 has one curved surface 36, a slanted bottom 40, and a non-sloping surface in a radially extending wall 96 which define the channel 94.

Figure 7:
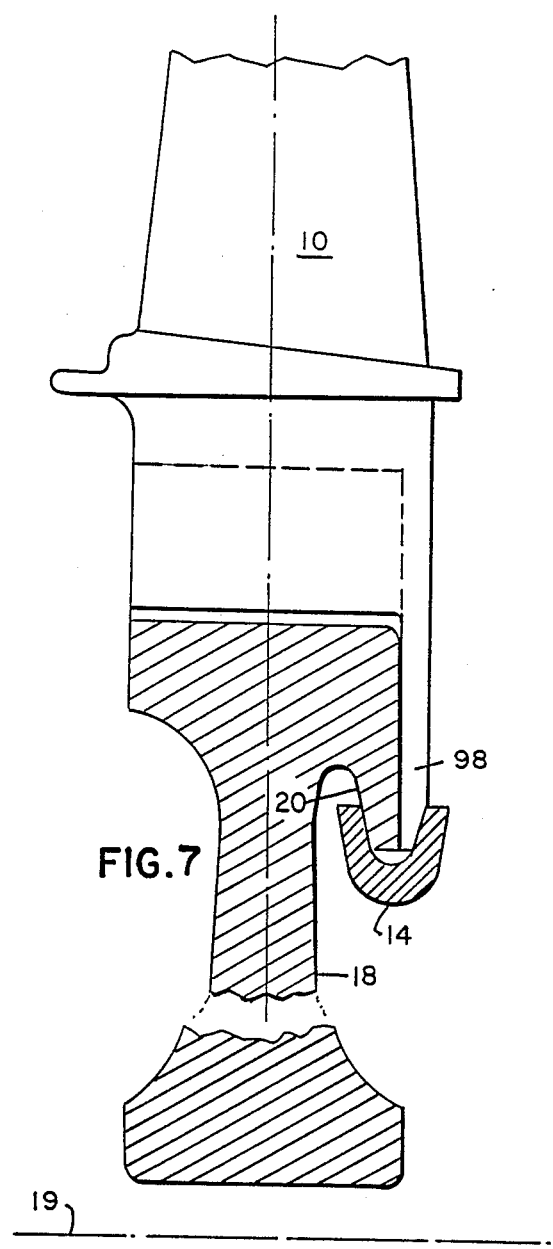
FIG. 7 shows a partial sectional side view of a ring for retaining compressor or turbine blades on a disc without the use of a cooling plate.

FIG. 7 shows an example of a retainer ring 14 in accordance with this invention clamping an integral flange 98 on turbine blade 10 to flange 20 on the turbine disc 18. The cooling plate 12 of the previously described examples of the invention is not used in the embodiment of FIG. 7.

Figure 8A:
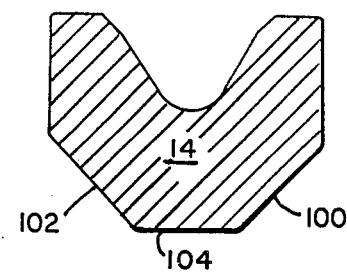
FIGS. 8A–8D show additional embodiments of the retainer ring of the invention.
Figure 8B:
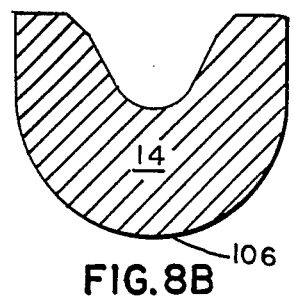
Figure 8C:
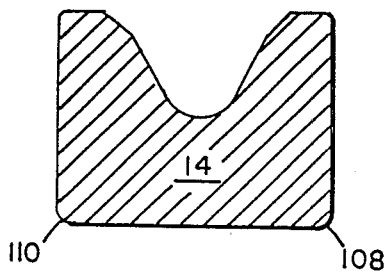
Figure 8D:
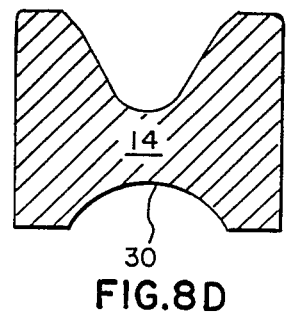

FIGS. 8A-8D are additional examples of retainer rings in accordance with this invention. FIG. 8A shows a ring 14 with slanted sides 100 and 102 and a narrow bottom 104, which allow the ring to be inserted into tight spaces. FIG. 8B shows a retainer ring 14 with a curved bottom surface 106, which is easier to machine than the other rings 14 described above. FIG. 8C shows a flat bottom ring 14 having rounded corners 108 and 110, which are also relatively easy to machine. FIG. 8D shows a ring 14 having a curved recess 30 for accommodation of complementary retention band (not shown).

Although preferred embodiments of the invention have been described above, other modifications will occur to those skilled in the art from teachings in this application. It is, therefore, desired to secure in the appended claims all such modifications as fall within the true spirit and scope of the invention. For instance, the retaining ring 14 can secure a seal to a rotating low pressure turbine disc or can secure any two rotating members together. It can also secure members that are not rotatable by utilizing only the radial forces due to the initial compression and expansion of the ring. The channel in the retaining ring 14 can have a combination of straight and curved surfaces, so long as the width of the channel decreases with increasing depth so as to axially clamp together two members wedged into the channel.

Having thus described preferred embodiments of the invention, what is claimed as novel and desired to be secured by Letters Patent of the United States is:

1. An apparatus for a gas turbine engine, comprising:
   a disc rotatable about an axis;
   a plurality of blades attached to and extending radially outward from an outer periphery of said disc;
   an annular plate rotatable about said axis and concentric with said disc for preventing axial displacement of said blades; and
   a retainer ring having a slanted gap, said retainer ring being rotatable about said axis and being concentric with said disc for clamping said plate to said disc in an axial direction in response to the action of centrifugal force on said retainer ring upon rotation thereof, said retaining ring further having an inner surface and a radially inward facing recess in said inner surface; and
   a retention band disposed in said recess, said band exerting a radially outward directed force on said ring to reinforce the clamping action of said ring.

2. In a gas turbine engine, apparatus for clamping first and second members together, said members being coaxially positioned relative to each other and being jointly rotatable about their common axis, said apparatus comprising:
   a continuous, radially compressible split ring having a single transverse gap, said ring being coaxially positioned relative to said first and second members and including an external peripheral surface; and
   a radially outward facing channel formed in said peripheral surface configured to jointly accept portions of said first and second members, the width of said channel decreasing in a radially inward direction so as to convert centrifugal force acting upon said ring upon rotation thereof with said members into an axially directed force to provide said clamping.

3. The apparatus of claim 2, wherein said first member comprises a disc having a plurality of blades attached to and extending radially outward from the outer periphery of said disc;
   said second member comprising an annular plate axially urged against said blades to prevent axial displacement of said blades; and
   said member portions comprising a pair of mutually contacting flanges extending radially inward and configured to contact the sidewalls of said channel throughout the length of said channel.

4. The apparatus of claim 3, in which said channel has a uniform cross section shaped to provide a space radially inward of said flanges when said flanges engage said sidewalls.

5. The apparatus of claim 4, in which said channel cross section is generally wedge-shaped; and
   said flanges being tapered so as to jointly conform to said sidewalls.

6. The apparatus of claim 5, wherein the sides of said channel cross section are curved.

7. The apparatus of claim 5, wherein at least portions of the sides of said channel cross section are linear.

8. The apparatus of Claim 7, in which the angle defined by said linear portions of said sides is about 50 degrees.

9. The apparatus of claim 8, in which each of said sides includes a chamfer between said linear portion and said external peripheral surface.

10. The apparatus of claim 4, in which said transverse gap is slanted relative to a radial plane which contains said common axis.

11. The apparatus of claim 10, in which said gap defines two substantially parallel, planar end faces of said ring, each of said end faces forming an angle of about 22° with respect to said radial plane.

12. The apparatus of claim 4, in which said ring includes an inner surface; and
   a radially inward facing recess formed in said inner surface.

13. The apparatus of claim 12 and further comprising a retention band disposed in said recess, said band exerting a radially outward directed force on said ring for holding said ring against said flanges.

* * * * *